United States Patent
Gentz

(10) Patent No.: US 8,596,447 B2
(45) Date of Patent: Dec. 3, 2013

(54) INCLINED CONVEYOR FOR A COMBINE

(75) Inventor: Hans-Jürgen Gentz, Bad Salzdetfurth (DE)

(73) Assignee: Artemis Kautschuk-und Kunstoff-Technik GmbH (DE)

( * ) Notice: Subject to any disclaimer, the term of this patent is extended or adjusted under 35 U.S.C. 154(b) by 0 days.

(21) Appl. No.: 13/387,282

(22) PCT Filed: Jul. 16, 2010

(86) PCT No.: PCT/DE2010/000819
§ 371 (c)(1),
(2), (4) Date: Apr. 5, 2012

(87) PCT Pub. No.: WO2011/012106
PCT Pub. Date: Feb. 3, 2011

(65) Prior Publication Data
US 2012/0186949 A1   Jul. 26, 2012

(30) Foreign Application Priority Data
Jul. 27, 2009 (DE) .......................... 10 2009 036 104

(51) Int. Cl.
*B65G 19/24* (2006.01)
(52) U.S. Cl.
USPC .................................................. 198/731

(58) Field of Classification Search
USPC ............... 198/728, 730, 731, 817, 734, 847
See application file for complete search history.

(56) References Cited

U.S. PATENT DOCUMENTS

| | | | |
|---|---|---|---|
| 1,723,357 A * | 8/1929 | Koopman | 198/690.2 |
| 2,906,395 A * | 9/1959 | Greer | 198/850 |
| 4,269,303 A * | 5/1981 | Cornell | 198/733 |
| 4,663,042 A * | 5/1987 | Rasper et al. | 210/525 |
| 4,697,693 A * | 10/1987 | Rajala et al. | 198/699 |
| 4,815,587 A * | 3/1989 | Musil | 198/728 |
| 4,899,868 A * | 2/1990 | Johnson | 198/520 |
| 5,000,310 A * | 3/1991 | Edmondson | 198/731 |
| 5,369,833 A * | 12/1994 | Uttke et al. | 15/84 |
| 5,671,839 A * | 9/1997 | Sanderson | 198/848 |
| 5,738,223 A * | 4/1998 | Rohrs | 209/307 |
| 7,036,656 B2 * | 5/2006 | Gariglio | 198/689.1 |
| 7,059,465 B2 * | 6/2006 | Chan | 198/465.3 |
| 7,131,532 B2 * | 11/2006 | Webster et al. | 198/867.15 |

* cited by examiner

*Primary Examiner* — Douglas Hess
(74) *Attorney, Agent, or Firm* — Becker & Stachiak, P.C.; Robert Becker

(57) ABSTRACT

An inclined conveyor for a combine comprising at least two endlessly wound toothed belts that extend parallel to one another and are made of cross-linked polymer reinforced with woven fabric plies. The toothed belts are connected together by coupling strips, and the toothed belts are provided with securement mechanisms for the coupling strips.

10 Claims, 3 Drawing Sheets

INCLINED CONVEYOR FOR A COMBINE

The instant application should be granted the priority dates of Jul. 27, 2009, the filing date of the corresponding German patent application 10 2009 036 104.9, as well as Jul. 16, 2010, the filing date of the International patent application PCT/DE2010/000819.

BACKGROUND OF THE INVENTION

The present invention relates to an inclined conveyor for a combine harvester, also simply known as a combine.

Combines are equipped with an attachment that is provided with a reel for picking up the harvested material, and a transverse screw conveyor disposed behind the reel that compresses the harvested material and conveys it toward the center to an inclined conveyor, which is disposed in a channel member and conveys the harvested material into a threshing apparatus of the combine.

Inclined conveyors of the aforementioned general type are known, for example, from DE 17 73 257, DE 602 22 881 T2, DE 10 2005 027 841 A1 and DE 10 2004 036 183 A1. These inclined conveyors are provided with at most two endless pulling means that extend parallel to one another and that are guided about a lower pulling means guide and an upper pulling means guide, whereby the upper pulling means guide is driven. The pulling means are interconnected by cleats or coupling strips that are disposed transverse to the pulling means, whereby the coupling strips are secured to the pulling means by suitable securement means, for example bolts or rivets.

According to the state of the art, endless chains are used as pulling means. In the literature, e.g. DE 10 2004 036 183 A1, it is mentioned that instead of the conveying chains belts or cables could also be used as pulling means. However, to date such pulling means have not found their way into practice, probably because they do not have the long-term tensile strength required for inclined conveyors.

It is an object of the present invention to provide assistance in this respect, and to provide a belt that has an adequate long-term tensile strength for use in an inclined conveyor.

SUMMARY OF THE INVENTION

This object is inventively realized with an inclined conveyor that includes at least two endless pulling means that extend parallel to one another and are in the form of endlessly wound toothed belts made of cross-linked polymer reinforced with woven fabric plies; and coupling strips for connecting the toothed belts together, wherein the toothed belts are provided with securement means for the coupling strips.

Thus, pursuant to the present invention an endlessly wound toothed belt made of cross-linked polymer reinforced with woven fabric plies is used as the pulling means. The phrase "endlessly wound toothed belt" includes a belt that, for example in the case of the use of an elastomer, is produced in the following manner: a woven fabric strip that is rubberized on both sides is wound to form a package that essentially has the geometrical shape of the finished toothed belt. With this wound package, at least two woven fabric plies are disposed over one another, with the rubber layers disposed between them. A rubber layer is placed on the outside and on the inside of this wound package. This sandwich can then be placed into a molding or shape-providing vulcanization press, where it is vulcanized, whereby at the same time the teeth are formed out of the inwardly disposed rubber layer. It is to be understood that a high-strength woven fabric is utilized as the woven fabric. A toothed belt wound in this manner achieves the long-term tensile strength of its woven fabric plies, and can thus absorb the continuous tensile forces that are active when it is utilized in an inclined conveyor.

Pursuant to further advantageous embodiments of the invention, the securing means for the coupling strips can be vulcanized into the toothed belt, especially in the region of the teeth of the belt. In such a case, the teeth for the securement regions of the coupling strips can be separately manufactured with the securement means vulcanized in, wherein the securement means can be inserted through holes provided in the toothed belt, whereby the teeth serve as abutments for an impact against the toothed belt.

Pursuant to another embodiment, the teeth for the securement regions of the coupling strips can be separately manufactured with securement means that are formed on or mounted on, and the securement means can be inserted through holes provided in the toothed belt, whereby the tooth again serves as an abutment for an impact against the toothed belt.

In another embodiment, the securement means can be disposed in the grooves of the toothed belt and can be inserted through holes provided in the toothed belt until they come to stop against an abutment at the securement means on the toothed belt. With all of the embodiments, sleeves or bushings can be inserted into the holes, with such sleeves having a length, in relationship to the thickness of the toothed belt in the securement region, that is measured such that a defined, processed-reliable compression of the toothed belt is ensured by the securement means in the securement region.

BRIEF DESCRIPTION OF THE DRAWINGS

The invention will be explained subsequently in greater detail with the aid of exemplary embodiments, where an endlessly wound toothed belt made of vulcanized rubber reinforced with woven fabric plies is utilized. In the accompanying drawing:

FIG. 6 is an enlarged illustration of the section A-A of FIG. 2 pursuant to a third exemplary embodiment of the invention.

DESCRIPTION OF SPECIFIC EMBODIMENTS

Figure 1:
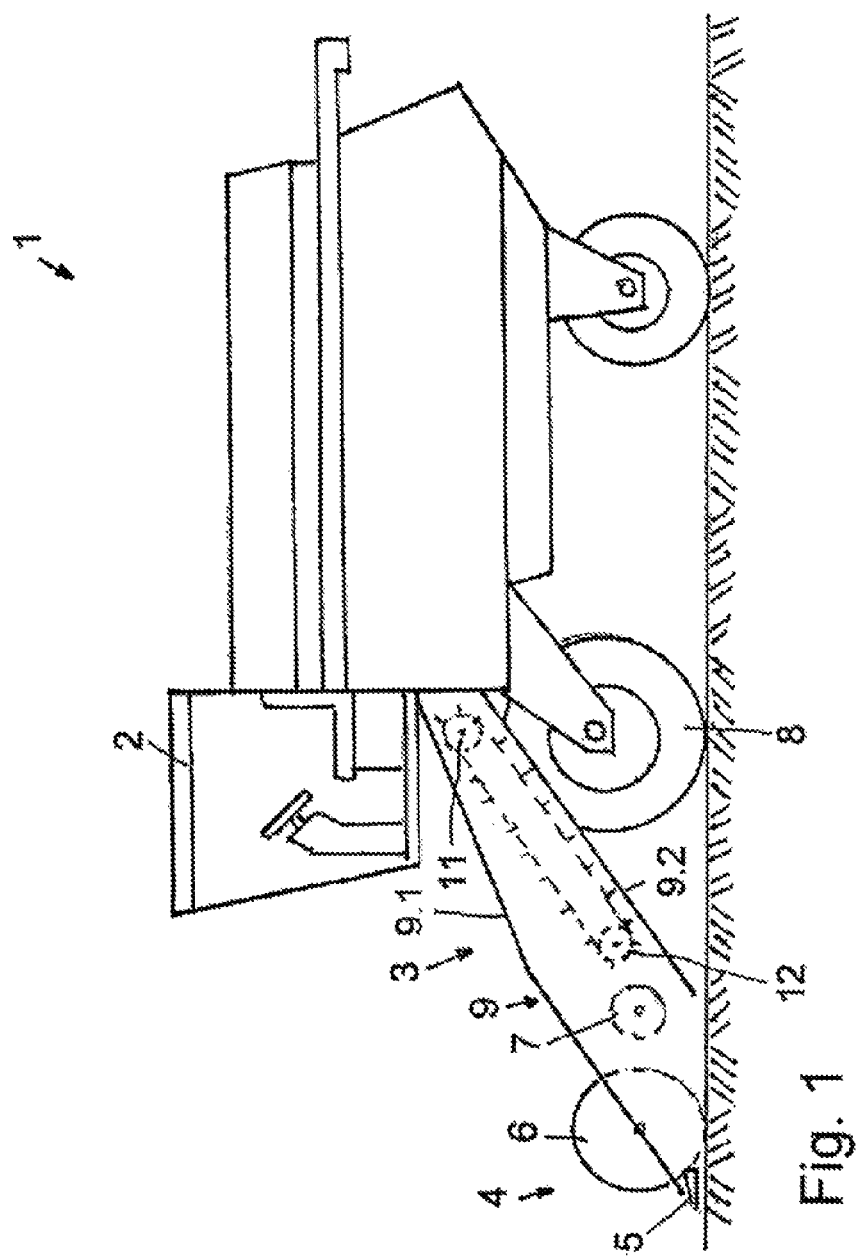
FIG. 1 is a schematic side view of a combine having a cutting unit and an inclined conveyor.

FIG. 1 shows an automatically operated combine 1. Below the driver's cab 2, an inclined conveyor 3 extends downwardly toward the front; at its front end, the inclined conveyor is equipped with a cutting or harvesting unit 4, which is comprised of a cutter bar 5, a reel 6 and a transverse screw conveyor 7. The cutting unit 4 is considerably wider than the combine 1 and customarily extends transversely beyond the front drive wheels 8 of the combine. The inclined conveyor 3 is narrower and generally has the width of the combine 1. The material that is to be harvested is cut off by the cutter bar 5, is picked up by the reel 6, and is fed to the transverse screw conveyor 7, which conveys and compacts the harvested material toward the center, and guides it to the inclined conveyor 3. The inclined conveyor 3 is disposed in a channel member 9, which has a cover wall 9.1, a bottom wall 9.2 and two side walls. The inclined conveyor 3 conveys the harvested material that is disposed on the bottom wall 9.2 of the channel member 9 to a non-illustrated thresher of the combine 1.

Figure 2:
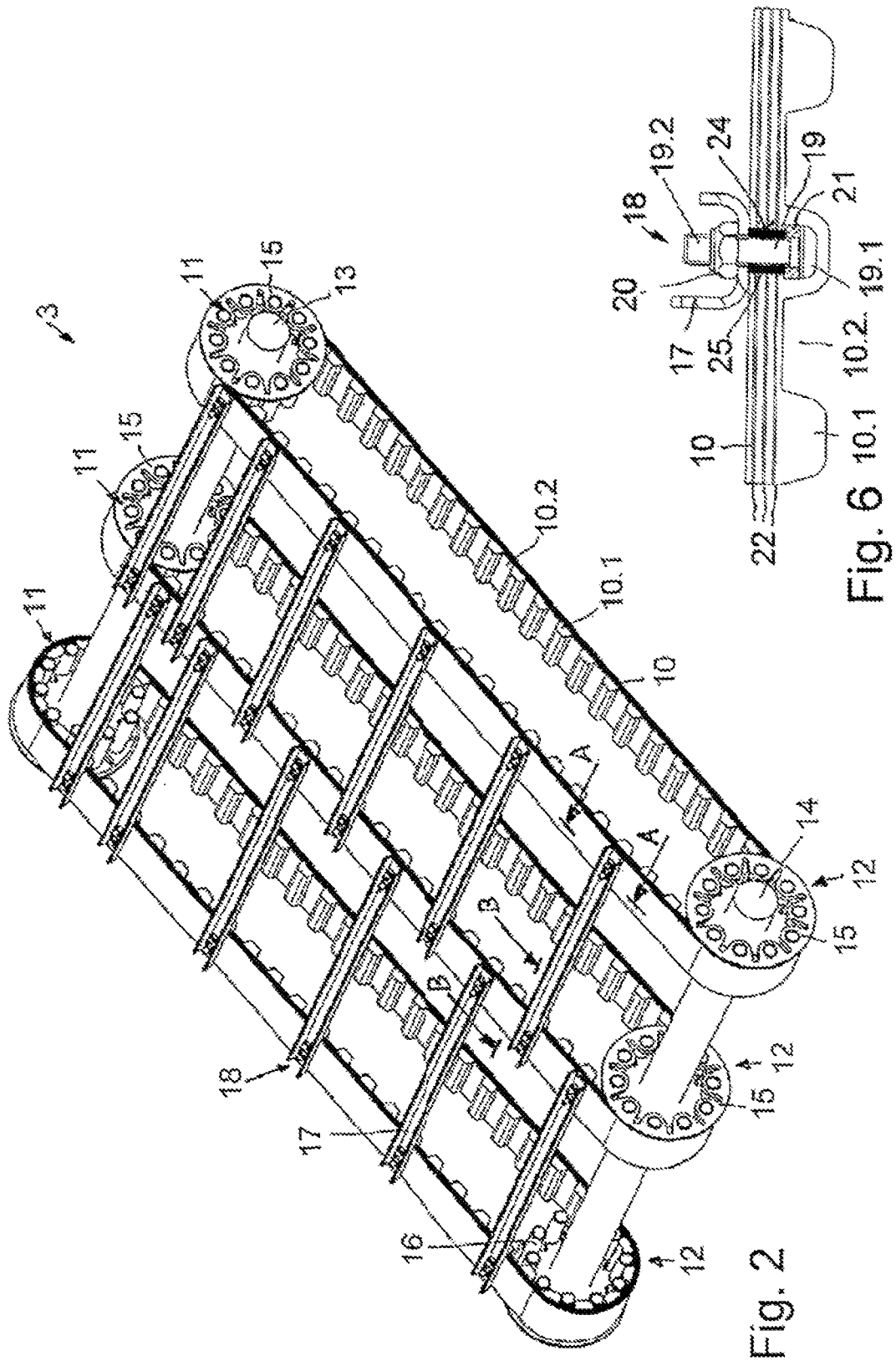
FIG. 2 is an isometric illustration of the inclined conveyor.

In FIG. 2, the inclined conveyor 3 is shown by itself. U has three toothed belts 10, which extend parallel to one another. These belts are guided about upper cam or gear wheels 11 and lower cam or gear wheels 12, which in the illustrated embodiment are embodied as welded structures. However, instead of a welded structure a cast structure is also possible. The upper gear wheels 11 are seated on a driven shaft 13, while the lower gear wheels 12, which are seated on a shaft 14, are carried along by the driven toothed or cogged belts 10. The gear wheels 11 and 12 are comprised of an axle disk that is fixedly connected with the shafts 13 and 14 respectively, and on the periphery of which cylindrical bolts or pins are welded so as to project perpendicularly. The pins are spaced from one another by a distance that corresponds to the spacing of the teeth 10.1 of the toothed belts 10. The pins 16 therefore engage in a positive or interlocking manner into the spaces or grooves 10.2 of the toothed belt 10 formed between the teeth 10.1. Each two adjacent toothed belts 10 are interconnected by spaced-apart cleats or coupling strips 17, whereby the coupling strips 17 of the respectively adjacent toothed belts 10 are spaced or staggered relative to one another.

Figure 3:
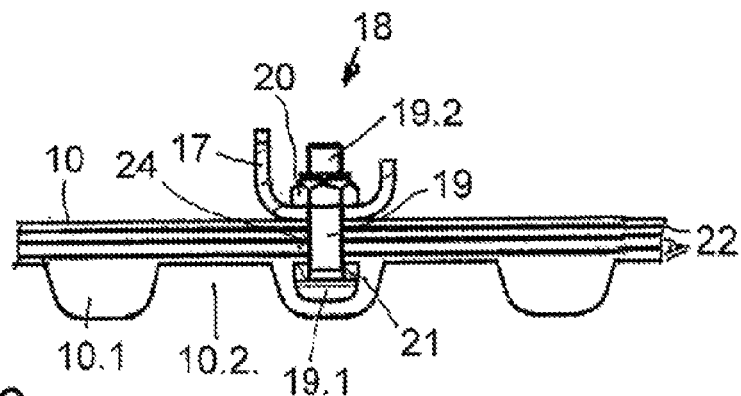
FIG. 3 is an enlarged illustration of the section A-A of FIG. 2.
Figure 4:
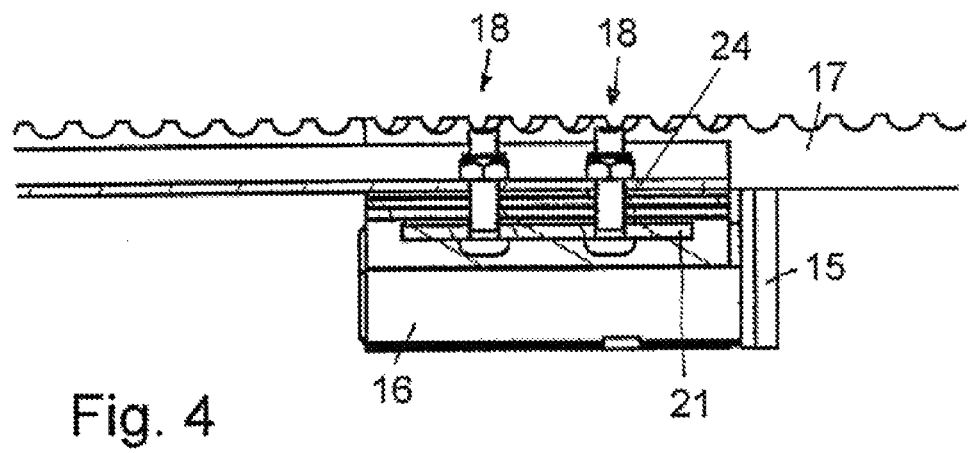
FIG. 4 is an enlarged illustration of the section B-B of FIG. 2.

In the embodiment illustrated in FIGS. 3, 4 and 6, the coupling strips 17 are secured to the toothed belt 10 via screw connections 18. These screw or bolt connections 18 are provided with screw bolts 19 that are vulcanized into the toothed belt 10 in the region of a tooth 10.1. This can be seen best from the illustration of FIG. 3. From this illustration, it can be seen that the head 19.1 of the screw bolt is embedded in the tooth 10.1, and the threaded shaft 19.2 extends through a hole 24 in the toothed belt 10 as well as a hole in the coupling strips 17. The securement of the coupling strips 17 on the toothed belt 10 is effected by threading a nut 20 onto the threaded shaft 19.2 of the screw bolt 19. In order to be able to absorb the tensile forces that thereby act upon the head 19.1 of the screw bolt 19 without damaging the toothed belt 10, the bolt head 19.1 rests on an anchor plate or plate washer 21 that with respect to surface area is larger.

As can be seen from the illustration in FIG. 4, the connection location between the toothed belt 10 and the coupling strips 17 is provided with two bolt connections 18.

It can be seen in particular from the illustration of FIG. 3 that the toothed belt 10 is provided with three fabric plies or layers 22 that are wound over one another and that are separated from one another by rubber layers. As already described above, these fabric plies 22 are wound endlessly, so that the toothed belt 10 has a high long-term tensile strength.

Inclined conveyors 3 that are equipped with the above-described toothed belt 10 have the advantage over inclined conveyors 3 that are conventionally equipped with chains that they are considerably more resistant to wear and noise, since at the guide or deflection locations there is no metal on metal contact.

Figure 5:
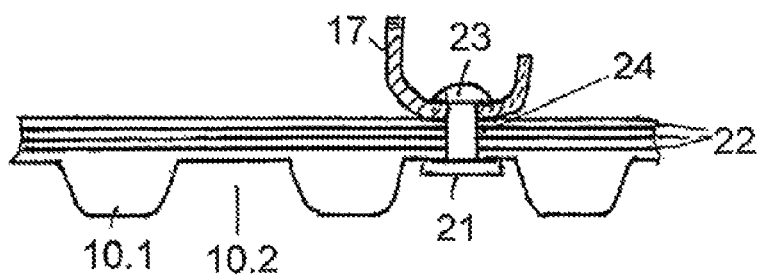
FIG. 5 is an enlarged illustration of the section A-A of FIG. 2 pursuant to a second exemplary embodiment of the invention.

FIG. 5 illustrates a further exemplary embodiment of the present invention. In contrast to the embodiment described above, here the securement locations of the coupling strips are not provided in the region of the teeth 10_11 but rather in the region of the grooves 102. Provided in the toothed belt 10 at the securement regions of the coupling strips 17 are holes 24 through which a rivet 23 respectively extends. In order to be able to absorb the tensile forces that occur during the production of the rivet connection, the rivet 23 is integrally connected with a plate washer 21, which corresponds to that of the previous embodiment. Instead of the rivet connection illustrated in FIG. 5, it is, of course, also possible to use a screw or bolt connection 18 as in the first embodiment.

A third exemplary embodiment of the present invention is illustrated in FIG. 6. This embodiment differs from the previously described embodiments in that bushings or sleeves 25 are inserted into the holes 24 of the toothed belt 10 through which the threaded shaft 19.2 of the screw bolts 19 extends, The length of the sleeves 25 in relation to the thickness of the toothed belt 10 in the securement region is measured such that a defined, process-reliable compression of the toothed belt 10 via the securement means 18 is ensured in the securement region, since when the ends of the sleeve 25 rest against the plate member 21 and the coupling strip 17 respectively, a further compression of the toothed belt 10 due to tightening of the nut 20 is not possible, at least at a normal application of force.

The specification incorporates by reference the disclosure of German 10 2009 036 104.9filed Jul. 27, 2009, as well as International application PCT/DE2010/000819 filed Jul. 16, 2010.

The present invention is of course, in no way restricted to the specific disclosure of the specification and drawings, but also encompasses any modifications within the scope of the appended claims.

The invention claimed is:

1. An inclined conveyor for a combine, comprising:
   at least two endless pulling means that extend parallel to one another, wherein said pulling means are endlessly wound toothed belts that are made of cross-linked polymer reinforced with woven fabric plies;
   coupling strips for connecting said toothed belts together, wherein said toothed belts are provided with securement means for said coupling strips,
   wherein said toothed belts each comprise a woven fabric strip that is rubberized on both sides and is wound to form a wound package that has substantially the geometrical shape of a finished toothed belt, wherein in said package, at least two fabric plies are disposed over one another with the rubberized sides disposed between said fabric plies;
   a rubber layer disposed on both an outside and an inside of the wound package and vulcanized thereon; and
   teeth formed out of the rubber layer disposed on the inside of the wound package.

2. An inclined conveyor according to claim 1, wherein said securement means for said coupling strips are vulcanized into said toothed belt.

3. An inclined conveyor according to claim 2, wherein said securement means are vulcanized into the region of teeth of said toothed belt.

4. An inclined conveyor according to claim 3, wherein said teeth for securement regions of said coupling strips are manufactured separately with said securement means vulcanized therein, further wherein said securement means are inserted through holes provided in said toothed belt, and wherein said teeth serve as abutments for an impact against said toothed belt.

5. An inclined conveyor according to claim 4, which further includes sleeves inserted into respective ones of said holes, and wherein a length of said sleeves in relationship to a thickness of said toothed belt in the securement region is measured such that a defined, process-reliable compression of said toothed belt is ensured by said securement means in the securement region.

6. An inclined conveyor according to claim 1, wherein teeth of said toothed belt as securement regions for said coupling strips are manufactured separately with said securement means formed or mounted thereon, further wherein said securement means are inserted through holes provided in said toothed belt, and wherein said teeth serve as abutments for an impact against said toothed belt.

7. An inclined conveyor according to claim 6, wherein said teeth are made of metal.

8. An inclined conveyor according to claim 6, which further includes sleeves inserted into respective ones of said holes, and wherein a length of said sleeves in relationship to a thickness of said toothed belt in the securement region is measured such that a defined, process-reliable compression of said toothed belt is ensured by said securement means in the securement region.

9. An inclined conveyor according to claim 1, wherein said securement means are disposed in grooves located between teeth of said toothed belt, and wherein said securement means are inserted through holes provided in said toothed belt until said securement means come to stop against an abutment on said toothed belt formed at said securement means.

10. An inclined conveyor according to claim 9, which further includes sleeves inserted into respective ones of said holes, and wherein a length of said sleeves in relationship to a thickness of said toothed belt in the securement region is measured such that a defined, process-reliable compression of said toothed belt is ensured by said securement means in the securement region.

* * * * *